United States Patent
Sizikov et al.

(10) Patent No.: US 9,746,893 B1
(45) Date of Patent: Aug. 29, 2017

(54) DELAYING POWER RESTORATION

(71) Applicant: Google Inc., Mountain View, CA (US)

(72) Inventors: Gregory Sizikov, Cupertino, CA (US); Richard Roy, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 183 days.

(21) Appl. No.: 14/525,935

(22) Filed: Oct. 28, 2014

(51) Int. Cl.
G06F 1/28 (2006.01)
H01H 7/00 (2006.01)
G06F 1/30 (2006.01)

(52) U.S. Cl.
CPC . *G06F 1/28* (2013.01); *G06F 1/30* (2013.01)

(58) Field of Classification Search
CPC ...... G06F 13/24; G06F 13/32; G06F 13/4081; G06F 11/1004; G06F 12/0886; G06F 13/4027
USPC .......................................................... 361/28
See application file for complete search history.

(56) References Cited

U.S. PATENT DOCUMENTS

| | | | |
|---|---|---|---|
| 5,454,114 A | 9/1995 | Yach | |
| 5,910,690 A * | 6/1999 | Dorsey | G06F 13/4081 307/141 |
| 6,008,550 A * | 12/1999 | Dorsey | G06F 13/4081 307/141 |
| 6,154,772 A * | 11/2000 | Dunn | H04M 11/062 725/109 |
| 6,208,666 B1 * | 3/2001 | Lawrence | H04M 11/062 370/498 |
| 6,434,562 B1 * | 8/2002 | Pennywitt | H04M 11/062 |
| 6,574,695 B1 * | 6/2003 | Mott | G06F 13/4081 710/302 |
| 6,687,573 B2 | 2/2004 | Egolf | |
| 7,560,829 B2 | 7/2009 | Proefrock | |
| 7,804,672 B2 | 9/2010 | Tonry | |
| 8,086,783 B2 * | 12/2011 | O'Connor | G06F 11/1004 711/5 |
| 8,966,148 B2 * | 2/2015 | Campbell | G06F 13/24 370/400 |
| 2003/0156368 A1 * | 8/2003 | Williams | H05K 1/0231 361/58 |
| 2008/0238488 A1 | 10/2008 | Comisky | |
| 2010/0217915 A1 * | 8/2010 | O'Connor | G06F 12/0886 711/5 |
| 2013/0322264 A1 * | 12/2013 | Campbell | G06F 13/24 370/245 |
| 2015/0139246 A1 * | 5/2015 | Campbell | G06F 13/24 370/401 |

* cited by examiner

*Primary Examiner* — Eduardo Colon Santana
*Assistant Examiner* — Devon Joseph
(74) *Attorney, Agent, or Firm* — Fish & Richardson P.C.

(57) ABSTRACT

Methods, systems, and apparatus, including computer programs encoded on a computer storage medium, for identifying, for each of multiple circuits of an electrical device, a discharge time that indicates an amount of time previously taken for a voltage level of the circuit to decrease from a normal operating voltage to a specified voltage level after power was removed from the circuit. A delay time period is determined for the electrical device based on each discharge time. A command is received to cycle power to one or more components of the electrical device. In response to receiving the command, power is removed from the circuits for an amount of time that corresponds to the delay time period and power is restored to the circuits in response to the amount of time lapsing.

20 Claims, 4 Drawing Sheets

DELAYING POWER RESTORATION

BACKGROUND

Computing components and systems can be installed on circuit boards, cards, or trays. For example, the computing components may be installed on circuit boards that are connected to (e.g., plugged into) a backplane or installed in a rack or cabinet. A backplane can provide power to the circuit boards and communication between the computing components installed on the boards and other devices. In addition, a backplane system allows for circuit boards, and therefore computing components and systems, to be easily installed and replaced.

Hot swap controllers enable circuit boards to be installed and removed from a backplane without removing power from the backplane. For example, a hot swap controller may include circuitry that limits inrush currents to circuit boards when the circuit boards are inserted into a powered backplane. A hot swap controller may also protect circuit boards from abnormal voltage conditions, e.g., overvoltage or undervoltage conditions.

SUMMARY

This specification describes technologies relating to delaying the restoration of power to computer components, e.g., components that are installed on a circuit board connected to a backplane.

In general, one innovative aspect of the subject matter described in this specification can be embodied in methods that include the actions of identifying, for each of multiple circuits of an electrical device, a discharge time that indicates an amount of time previously taken for a voltage level of the circuit to decrease from a normal operating voltage to a specified voltage level after power was removed from the circuit; determining a delay time period for the electrical device based on each discharge time; receiving a command to cycle power to one or more components of the electrical device; and in response to receiving the command: removing power from the circuits for an amount of time that corresponds to the delay time period; and restoring power to the circuits in response to the amount of time lapsing. Other embodiments of this aspect include corresponding systems, apparatus, and computer programs, configured to perform the actions of the methods, encoded on computer storage devices.

These and other embodiments can each optionally include one or more of the following features. In some aspects, the electrical device is a circuit board. In some implementations, determining the delay time period includes selecting, as the delay time period, the discharge time indicating a longest amount of time from among the amounts of time for the circuits.

Some aspects include performing a calibration operation. The calibration operation can include removing power from the circuits and determining, for each of the circuits, the amount of time taken for the voltage level of the circuit to decrease to the specified voltage level. Identifying a discharge time for each of the circuits of the electrical device can include identifying the discharge times determined from the calibration operation.

In some aspects, the calibration operation is performed periodically. Some implementations include determining that the voltage level of a given circuit of the circuits exceeded the specified voltage level for a time period that exceeded the discharge time for the given circuit after power was removed from the circuits during a power cycling event for the circuit board and, in response, initiating the calibration operation.

Some aspects include determining that an amount of time for the voltage level of a given circuit to discharge during a power cycling event of the circuit board exceeded the discharge time for the given circuit by at least a threshold amount of time and, in response, initiating the calibration operation. In some aspects, the calibration operation is performed in response to a change in one or more of the components of the circuit board.

Particular embodiments of the subject matter described in this specification can be implemented so as to realize one or more of the following advantages. Computing components can be protected from damage caused by remainder voltages (e.g., charge that presents as a voltage) that remain on a circuit board when power is restored to the circuit board by delaying the restoration of power to the board until the remainder voltage has time to decrease to a specified level. Delaying the restoration of power until the remainder voltage has had time to decrease to the specified level ensures that state machines or other logic devices installed on the circuit board restart in known or predictable states. For circuit boards that include multiple circuits (e.g., multiple power circuits at different voltage levels), the restoration of power can be delayed to allow the voltage level of each circuit to decrease to the specified voltage level. A calibration operation can be performed, e.g., periodically, to determine the amount of time that it takes for the voltage level of each circuit to decrease to the specified level. The restoration of power to each circuit can then be delayed based on the longest discharge time determined using the calibration operation to allow the voltage level of each circuit time to decease to the specified voltage level during each power cycling event or reboot cycle.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Computing components and systems installed on electrical devices (such as circuit boards, cards or trays) can be rebooted by cycling power to the electrical device (e.g., by removing power from the electrical device and restoring the power to the electrical device). After the power is removed, the voltage on the electrical device may take some time to discharge or to decrease to a desirable level. For example, many electrical devices include capacitors that store potential energy or a charge. When the power is removed from the electrical device, the capacitors can take time to discharge causing a charge to remain on the electrical device until the capacitor has fully discharged. This charge, which presents as a remainder voltage, can damage components installed on the electrical device and/or lead to unpredictable states for state machines or other logic devices installed on the electrical device.

Systems and techniques described herein can delay restoration of power to an electrical device based on a delay time period. For example, the delay time period may specify an amount of time to wait between the time at which power is removed from the electrical device and the time at which power is restored to the electrical device. Some electrical devices include multiple power circuits that each provide power to one or more components of the electrical device. Each power circuit may take a different amount of time for its voltage to decrease to a particular voltage level, for example, due to the different components powered by the power circuits and/or the different voltage levels of the power circuits. The delay time period may be set to allow the voltage level of each power circuit time to decrease to the particular voltage level. For example, the delay time period may be set based on the discharge time for the power circuit that takes the longest for its voltage level to decrease to the particular voltage level.

The description that follows provides examples in the context of a circuit board with multiple power circuits. Although the systems and techniques described herein are described largely in terms of cycling the power of components of a circuit board installed in a backplane, the techniques can also be applied to other electrical and computer components for which power is cycled. For example, the techniques can be used to ensure that the voltage level has dropped to an appropriate level for rack-mounted computing components, fixed-mounted circuit boards, and/or individual components. In a particular example, a system may monitor the discharge time of a voltage level of an input power circuit for an individual server to ensure that the voltage level drops to an appropriate level before restoring power to the circuit. In addition, the techniques can be used to ensure that the voltage level of other types of electrical circuits has time to decrease to a specified voltage during a power cycling event before restoring power to the circuits.

Figure 1:
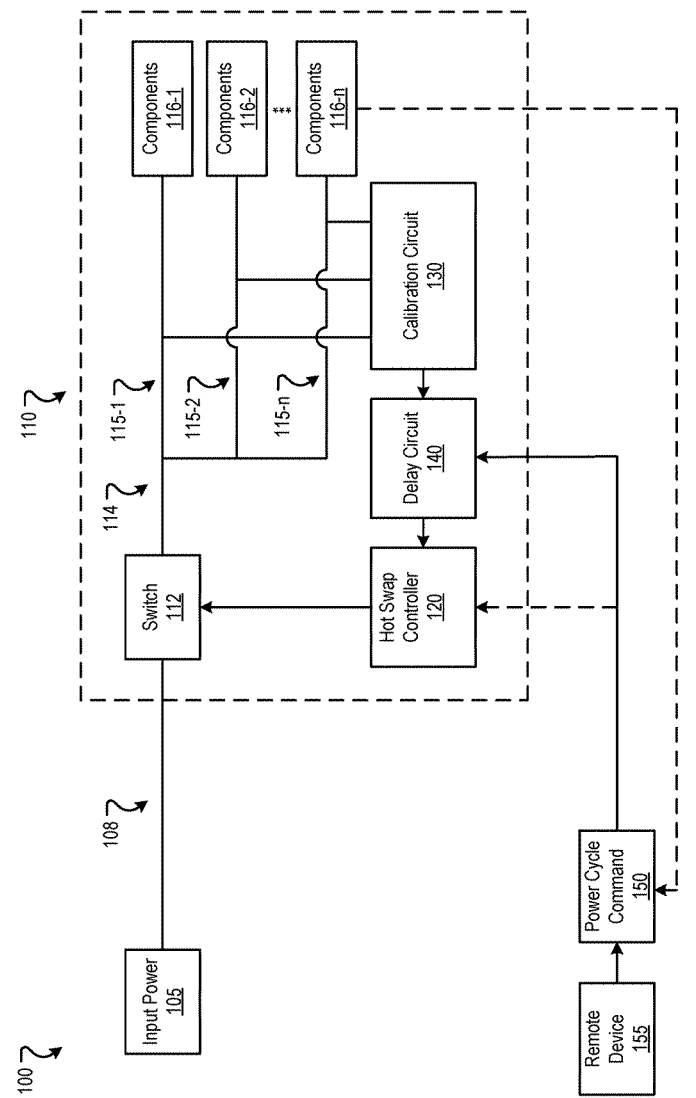
FIG. 1 is a block diagram of an example circuit in which power is cycled to components of a circuit board.

FIG. 1 is a block diagram of an example circuit 100 in which power is cycled to components of a circuit board 110. The circuit board 110 can include electrical and/or computer components 116-1-116-n installed thereon. For example, the circuit board 110 may include one or more processors (e.g., CPUs), memory storage devices, network devices, resistors, capacitors, integrated circuits, state machines, and/or other components.

The circuit board 110 may be configured for installation in a backplane or in a rack that is configured to provide power to the circuit board 110. For example, the circuit board 110 may include connectors that insert into corresponding connectors of a backplane. The connectors of the circuit board 110 may include connectors for receiving power from the backplane. The connectors may also include connectors that, together with corresponding connectors of the backplane, provide a communication path between the components 116-1-116-n of the circuit board 110 and other devices.

The circuit board 110 receives power from an input power source 105 by way of an input power bus 108. The input power bus 108 may be a bus bar, cable, wires, or another appropriate set of one or more conductors. In some implementations, the input power source 105 is a direct current (DC) power source for powering computing components. The input power bus 108 may include power rails of a backplane that is connected to the input power source 105. The input power bus 108 may also include power connectors that can connect to corresponding power connectors of the circuit board 110.

The circuit board 110 includes a switch 112 that selectively allows input power of the input power bus 108 to energize a primary power bus 114—e.g., a bus bar, cable, wires, or another appropriate set of one or more conductors—of the circuit board 110. In some implementations, the switch 112 is implemented as a semiconductor switch, e.g., as a transistor, a field-effect transistor (FET), or a metal-oxide semiconductor field-effect transistor (MOSFET). The switch 112 may be installed on, connected to, or otherwise supported by the circuit board 110. The switch 112 may be electrically connected between the primary power bus 114 and circuit board connectors that connect to power connectors of the backplane. The power bus 114 may be part of a power circuit that provides power to the components 116-1-116-n. For example, the power circuit may include the power bus 114 and other components, e.g., a power supply, power converter, and or voltage regulator.

When energized, the primary power bus 114 provides power to a number "n" of power circuits 115-1-115-n. Each power circuit 115-1-115-n provides power to one or more respective components 116-1-116-n (e.g., electrical and/or computer components). In particular, the power circuit 115-1 provides power to components 116-1; the power circuit 115-2 provides power to components 116-2; and power circuit 115-n provides power to components 116-n. Each power circuit 115-1-115-n may include a bus bar, cable, wires, or another appropriate set of one or more conductors that routes power from the primary power bus 114 to the components 116-1-116-n.

Some computer components may operate at different voltages than other computer components. Each power circuit 115-1-115-n may supply power at a voltage level that is different from the voltage level of each other power circuit 115-1-115-n. For example, each power circuit 115-1-115-n may include a power supply and/or voltage regulator that manages the voltage level of the power circuit 115-1-115-n and its one or more conductors. In a particular example, the primary power bus 114 may provide DC power at a particular voltage level, while the secondary power circuits 115-1-115-n may provide DC power at voltage levels that are more or less than the particular voltage level. In another example, the primary power bus 114 may provide AC power at a particular voltage level, while the secondary power circuits 115-1-115-n may provide AC power at voltage levels that are more or less than the particular voltage level.

The circuit board 110 includes a hot swap controller 120 that operates the switch 112. The hot swap controller 120 can turn on the switch 112 (e.g., close the switch 112) to energize the primary power bus 114. The hot swap controller 120 can also turn off the switch 112 (e.g., open the switch 112) to prevent power from reaching the primary power bus 114. For example, the hot swap controller 120 may turn off the switch 112 in response to fault conditions, such as an abnormally high or abnormally low voltage at the input of the switch 112, or an overcurrent event at the components 116-1-116-n.

The hot swap controller 120 can also enable the circuit board 110 to be installed and removed from the backplane without de-energizing the input power bus 105. For example, the hot swap controller 120 may include circuitry that limits inrush currents to the circuit board 110 when the circuit board 110 is inserted into the backplane while the input power bus 108 is energized.

The hot swap controller 120 can also manage the power cycling process for the circuit board 110, for example, in combination with a delay circuit 140. Although the delay circuit 140 is illustrated as a separate component from the hot swap controller 120, the delay circuit 140 may be part of the hot swap controller 120. The delay circuit 140 can delay the restoration of power to the primary power bus 114 after power has been removed from the primary power bus 114, e.g., in response to a or power cycle command 150. For example, the delay circuit 140 may prevent the hot swap controller 120 from turning on the switch 112 until a delay time period has lapsed. In a particular example, the delay circuit 140 may start a timer at the beginning of the power cycling event, e.g., when power is removed from the primary power bus 114. Once the timer has reached the delay time period, the delay circuit 140 may send a command signal to the hot swap controller 120 that allows the hot swap controller 120 to restore power to the primary power bus 114. In turn, the hot swap controller 120 may turn on the switch 112.

The delay time period may be based on an amount of time that it takes for the voltage level of one or more of the power circuits 115-1-115-$n$ to decrease to a specified voltage level. For example, the specified voltage level may be a voltage level at which it is considered safe to restore power to the components 116-1-116-$n$ without damaging the components 116-1-116-$n$ or causing the components 116-1-116-$n$ to restart in an unpredictable state. The delay time period may be programmable, e.g., by a user programming the delay circuit 140. For example, the delay circuit 140 may be a programmable delay integrate circuit (IC) that allows a user to select the delay time period. The user may select the time period based on an observed amount of time taken by the power circuits 115-1-115-$n$ to reach the specified voltage level. For example, a user may monitor voltage measurements of the power circuits 115-1-115-$n$ after power is removed from the primary power circuit 114 and determine the amount of time for the voltage level of each power circuit 115-1-115-$n$ to decrease to the specified voltage level. The delay circuit 140 can store the delay time period and use the stored delay time period during power cycling events for the components 116-1-116-$n$. A power cycling event generally includes removing power from the components 116-1-116-$n$ and restoring power to the components 116-1-116-$n$, e.g., after the delay time period has lapsed. A power cycling event can be used as a reboot process for computing components.

The delay time period may be selected by a calibration circuit 130. The calibration circuit 130 may include one or more voltage detector circuits that each measure the voltage level of a respective power circuit 115-1-115-$n$. For example, the calibration circuit 130 may include a respective voltage detector circuit for each power circuit 115-1-115-$n$. The voltage level of a power circuit 115-1-115-$n$ may be the voltage level of a conductor that routes power to the circuit's components 116-1-116-$n$. For example, the voltage detector for a power circuit 115-1-115-$n$ may measure the voltage level of a conductor that routes power from the circuit's power supply or voltage regulator to the components 116-1-116-$n$.

The calibration circuit 130 may also include one or more timers that measure the amount of time for each power circuit 115-1-115-$n$ to decrease to the specified voltage level after power has been removed from the power circuits 115-1-115-$n$. The calibration circuit 130 may select as the delay time period the amount of time taken by the power circuit 115-1-115-$n$ that took the longest for its voltage to decrease to the specified voltage level.

Figure 4:
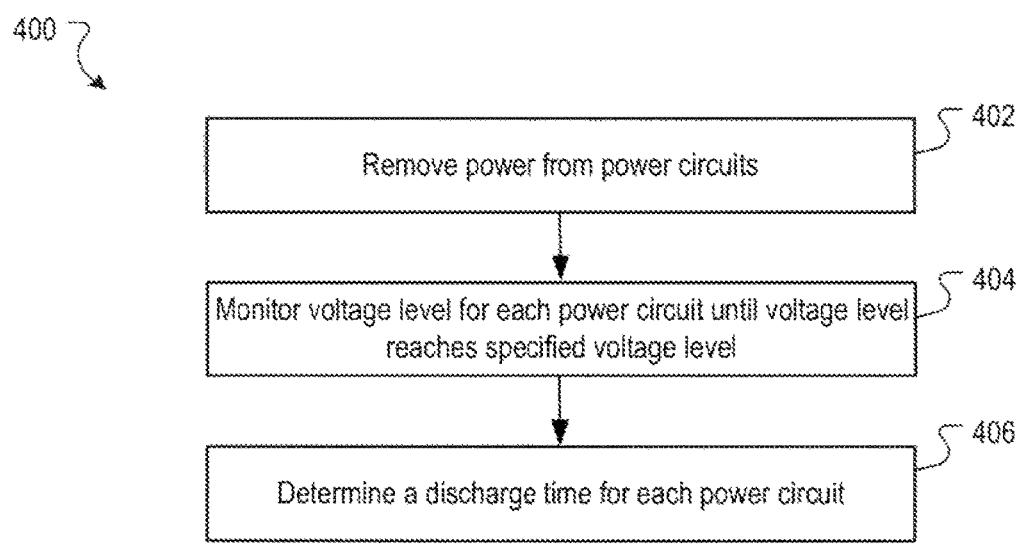
FIG. 4 is a flow diagram of an example calibration process.

The calibration circuit 130 may perform a calibration operation to select the delay time period or to provide data to the delay circuit 140 or hot swap controller 120 so that the delay circuit 140 or the hot swap controller 120 can select the delay time period. The calibration operation may include removing power from the primary power bus 114 (and the power circuits 115-1-115-$n$). The calibration circuit 130 can then monitor the voltage level of each power circuit 115-1 and determine the amount of time that it takes for the voltage level of each power circuit 115-1-115-$n$ to decrease to the specified voltage level. The calibration circuit 130 (or hot swap controller 120 or delay circuit 140) can then select one of the amounts of time as the delay time period. For example, the calibration circuit 130 (or hot swap controller 120 or delay circuit 140) may select the longest amount of time as the delay time period to allow sufficient time for the voltage level of each power circuit 115-1-115-$n$ to decrease to the specified voltage level during subsequent power cycling events. The calibration circuit 130 can then provide data specifying the selected delay time period to the delay circuit 140. An example calibration process is illustrated in FIG. 4 and described below.

The calibration circuit 130 may perform the calibration operation prior to placing the circuit board 110 into service (e.g., installed in a rack or backplane). For example, the calibration circuit 130 may perform the calibration operation in response to a user command prior to placing the circuit board 110 into service. The calibration circuit 130 can also perform the calibration operation after the circuit board 110 has been placed into service, e.g., while the circuit board 110 is connected to a backplane or rack. For example, the calibration circuit 130 may perform the calibration operation periodically based on a calibration time period (e.g., once a week, once a month, or some other appropriate time period).

The calibration circuit 130 may perform the calibration operation in response to detecting that it took longer than expected for a power circuit's voltage level to decrease to the specified voltage level during a or power cycling event. For example, the expected amount of time for a power circuit may be the amount of time that it took for the voltage level of the power circuit to decrease to the specified voltage level during a previous calibration operation. The calibration circuit 130 may monitor the voltage level of each power circuit 115-1-115-$n$ during power cycling events and the amount of time that it takes for the voltage level of each power circuit 115-1-115-$n$ to decrease to the specified voltage level during the power cycling events. If this expected amount of time is exceeded during a power cycling event, or exceeded by at least a threshold amount of time during the power cycling event, the calibration circuit 130 may initiate the calibration process to determine the delay time period for the circuit board 110.

As an example, the voltage level of the power circuit 115-1 may have taken ten seconds to decrease to the specified voltage level during a calibration operation. During a subsequent power cycling event, the voltage level of the power circuit 115-1 may have taken twelve second to decrease to the specified voltage level. If the threshold amount of time is two seconds or less, then the calibration circuit 130 may perform the calibration operation again.

In some implementations, the calibration circuit 130 may perform the calibration operation in response to the delay time period being exceeded by the time taken for the voltage of one or more power circuits 115-1-115-$n$ to decrease to the specified voltage level. For example, the delay time period for the circuit board 110 may be set to twenty seconds based on the amount of time it took for the voltage level of the power circuit 115-2 to decrease to the specified voltage level. If it takes longer than twenty seconds for the voltage level of one or more of the power circuits 115-1-115-$n$ to decrease to the specified voltage level during a power cycling event, the calibration circuit 130 may perform the calibration operation. Or, the calibration circuit 130 may change the delay time period to the amount of time taken by the one or more power circuits 115-1-115-$n$ during the power cycling event without performing the calibration operation.

The calibration circuit 130 may perform the calibration operation in response to detecting a change in operating conditions. For example, if the temperature around the circuit board 110 has changed by more than a threshold amount from the temperature around the circuit board 110 during the previous calibration operation, the calibration circuit 130 may perform the calibration operation. In another example, if the electrical characteristics of a power circuit 115-1-115-$n$ has changed, e.g., in response to a change in a component 116-1-116-$n$, the calibration circuit 130 may perform the calibration operation.

As the calibration operation effectively reboots the components 116-1-116-$n$, the calibration circuit 130 may prompt a user for permission before initiating a calibration operation. In some implementations, the calibration circuit 130 only performs the calibration operation when the components are inactive. In some implementations, the calibration circuit 130 performs the calibration operation each time power is removed from the components 116-1-116-$n$, for example, in response to detecting that power has been removed from the components 116-1-116-$n$.

In some implementations, each power circuit 115-1-115-$n$ may be associated with a specified voltage level to which the voltage of the power circuit 115-1-115-$n$ should decrease before power is restored to the power circuit 115-1-115-$n$. For example, a voltage level of 5 VDC may be safe for the components 116-1, while the components 116-2 are safe only at voltage below 3 VDC. In this example, the calibration circuit 130 may monitor the amount of time that it takes for each power circuit 115-1-115-$n$ to decrease to its respective specified voltage level. In particular, the calibration circuit 130 may determine the amount of time it takes for the voltage level of the power circuit 115-1 to decrease to 5 VDC and the amount of time it takes for the voltage level of the power circuit 115-2 to decrease to 3 VDC. The calibration circuit 130 may select as the delay time period the amount of time taken by the power circuit 115-1-115-$n$ that took the longest for its voltage to decrease to its specified voltage level.

Although the calibration circuit 130 is illustrated as being a part of the circuit board 110, the calibration circuit 130 may be external to the circuit board 110. For example, the calibration circuit 130 may be a separate device that receives voltage measurements for the power circuits and provides to the delay circuit 140 data indicating the delay time period for the power circuit(s) 115-1-115-$n$.

The power cycling event for the circuit board 110 can include removing normal operating power from the components 116-1 and 116-$n$ and later restoring power to the components 116-1-116-$n$, for example, without physically removing the circuit board 110 from the backplane. This power cycling can be accomplished by opening the switch 112 and later closing the switch 112. The circuit board 110 and the components 116-1-116-$n$ may be rebooted in response to a power cycle command 150. The power cycle command 150 may be received from a remote device 155, e.g., a computer, or from one of the components 116-1-116-$n$ installed on the circuit board 110. For example, a processor installed on the circuit board 110 may initiate the power cycle command 150. In this example, the processor may receive the power cycle command 150 from another device or initiate the power cycle command 150 based on instructions executed by the processor.

The power cycle command 150 may be issued periodically, may be issued in response to determining that a component 116-1-116-$n$ installed on the circuit board 110 has become unresponsive, or may be issued for another appropriate reason. For example, if a remote computer does not receive a response from the component, the computer may send a power cycle command to the circuit board (e.g., to the hot swap controller 120 or the delay circuit 140). By way of another example, the power to the circuit board may be cycled periodically. In yet another example, the power cycle command 150 may be issued by a user.

The power cycle command 150 may be received by the hot swap controller 120 and/or the delay circuit 140. In some implementations, the delay circuit 140 receives the power cycle command 150 and causes the hot swap controller 120 to turn off the switch 112 in response to the power cycle command 150. For example, the hot swap controller 120 may control the position of the switch 112 based on a signal received from the delay circuit 140. In a particular example, the hot swap controller 120 includes an enable pin and controls the position of the switch 112 based on whether the enable pin is enabled or disabled. In this example, the delay circuit 140 may disable the pin to turn off the switch 112 in response to receiving the power cycle command 150. In response to the enable pin being disabled, the hot swap controller 120 may turn off the switch 112 and keep the switch 112 turned off until the enable pin is re-enabled, e.g., by the delay circuit 140.

By turning off the switch 112, the power bus 108 is electrically disconnected from the primary power bus 114, removing input power from the primary power bus 114 and the power circuits 115-1-115-$n$. With power removed, the voltage level of the power bus 114 and the power circuits 115-1-115-$n$ decreases, for example, until capacitors installed on the circuit board 110 discharge. To prevent the components 116-1-116-$n$ from being damaged or rebooted in an unknown or unpredictable state, the delay circuit 140 may delay restoring power to the components 116-1-116-$n$ until the delay time period has lapsed. For example, once the delay circuit 140 determines that the power has been removed from the components 116-1-116-$n$ for an amount of time commensurate with the delay time period, the delay circuit may re-enable the enable pin of the hot swap controller 120.

The delay circuit 140 may be powered separately from other components 116-1-116-$n$ of the circuit board 110 such that the delay circuit 140 can remain powered on during the power cycling event. For example, the delay circuit 140 may receive power from the power bus 108 by way of a backplane connector.

In some implementations in which hot swap capabilities are not required, the delay circuit 140 may control the switch 112. In this example implementation, the delay circuit 140 may receive the power cycle command 150 and turn off the switch 112 in response to receiving the power cycle command 150. The delay circuit 140 may then keep the switch 112 in the off position until the delay time period lapses. In response to determining that the delay time period has lapsed, the delay circuit 140 may turn on the switch 112 to restore power to the circuit board 110 and its components 116-1-116-*n*.

Figure 2:
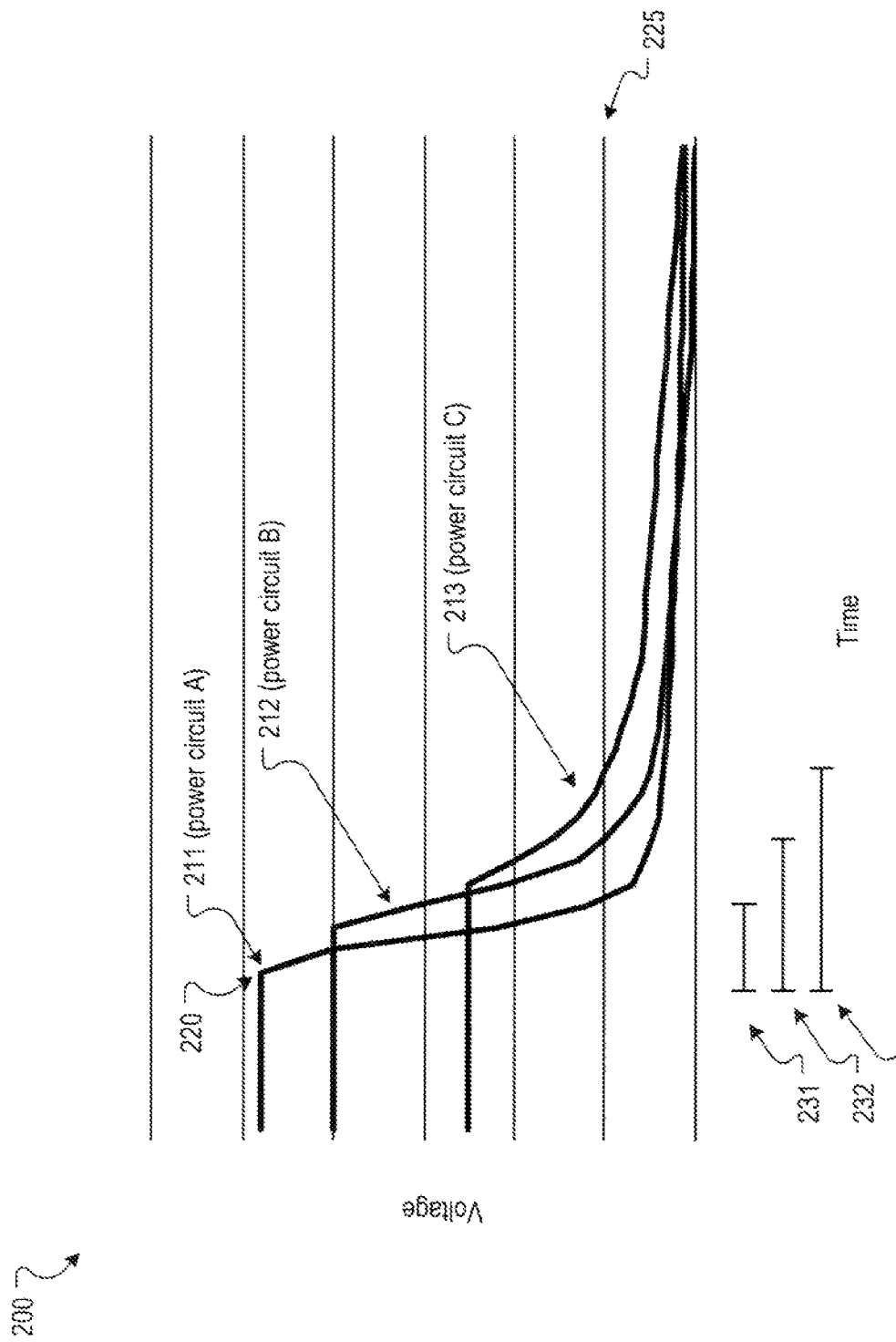
FIG. 2 is a diagram of voltage waveforms of multiple power circuits over a time period.

FIG. 2 is a diagram 200 of voltage waveforms 211-213 of multiple power circuits over a time period. The voltage waveforms 210-213 represent voltage levels of three power circuits during a calibration operation. The voltage waveform 211 represents the voltage level of power circuit A; the voltage waveform 212 represents the voltage level of power circuit B; and the voltage waveform 213 represents the voltage level of power circuit C. In this example, the normal operating voltage level for power circuit A is greater than the normal operating voltage level for power circuit B and the normal operating voltage for power circuit B is greater than the normal operating voltage for power circuit C. For example, each power circuit may power components at different voltage levels.

At point 220, power to the power circuits is removed and the voltage levels begin to decrease. During the calibration operation, a calibration circuit, such as the calibration circuit 130 of FIG. 1, monitors the voltage levels over time and determines how much time it takes for the voltage level of each power circuit to decrease to a specified voltage 225. In this example, the line 231 represents the amount of time that elapsed between the time that power was removed from the power circuits and the time at which the voltage level of power circuit A decreased to the specified voltage level 225; the line 232 represents the amount of time that elapsed between the time that power was removed from the power circuits and the time at which the voltage level of power circuit B decreased to the specified voltage level 225; and the line 233 represents the amount of time that elapsed between the time that power was removed from the power circuits and the time at which the voltage level of power circuit C decreased to the specified voltage level 225.

The calibration circuit, or a hot swap controller, can determine the delay time period for a circuit board that includes the power circuits A-C based on the amounts of time represented by the lines 231-233. For example, the delay time period may be set to the amount of time (or an amount of time greater than) the amount of time represented by the line 233 as it represents the longest amount of time. In this way, the restoration of power to the power circuits A-C can be delayed until all three power circuits A-C have had enough time to discharge to the specified voltage level during subsequent power cycling events.

Figure 3:
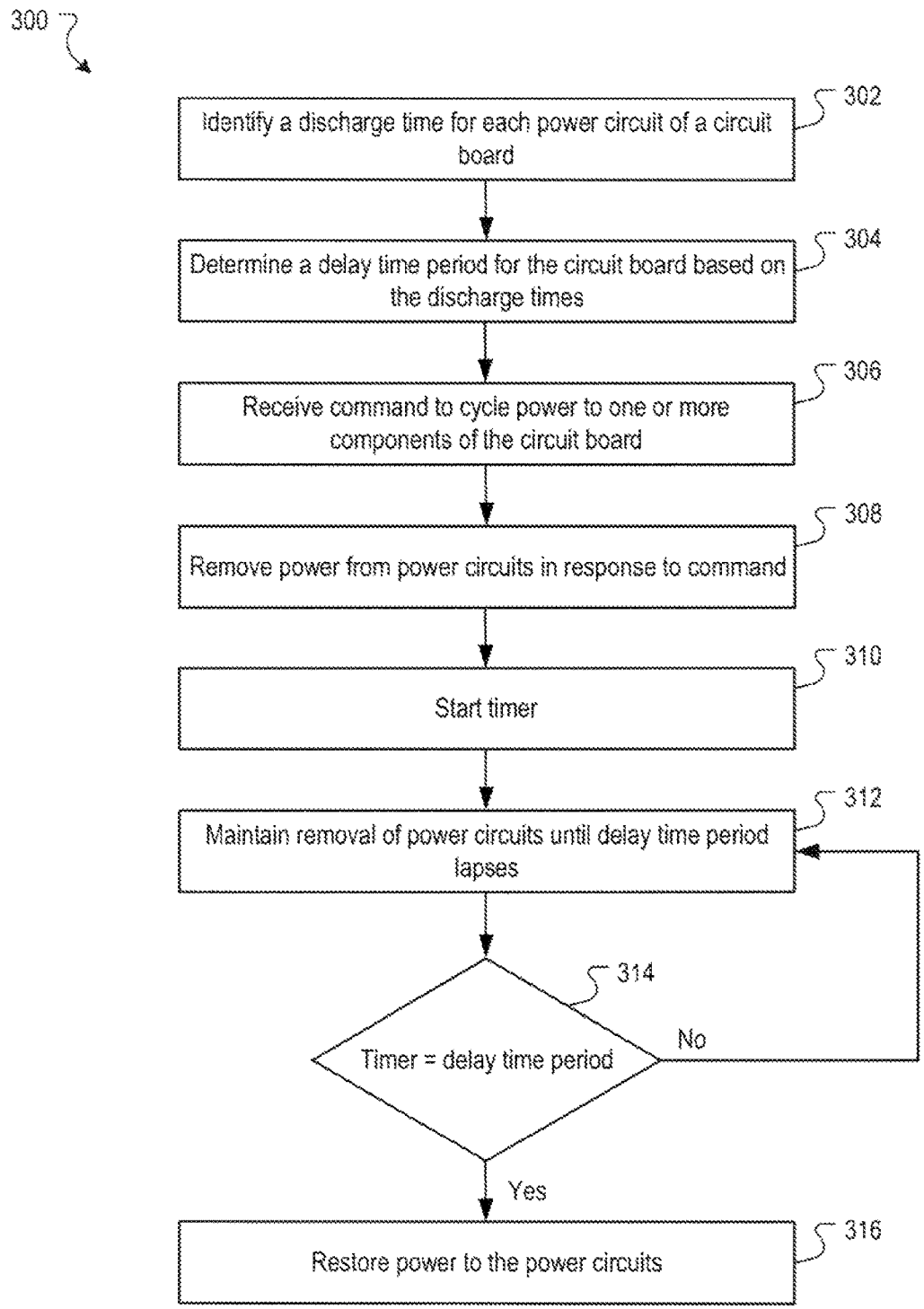
FIG. 3 is a flow diagram of an example process for delaying the restoration of power to a circuit board during a power cycling event.

FIG. 3 is a flow diagram of an example process 300 for delaying the restoration of power to a circuit board during a power cycling event. Operations of the process 300 can be implemented, for example, by a data processing apparatus, such as the hot swap controller 120 and/or the delay circuit 140 of FIG. 1. The process 300 can also be implemented by instructions stored on a non-transitory computer storage medium, where execution of the instructions by a data processing apparatus cause the data processing apparatus to perform the operations of the process 300.

A discharge time for each of multiple power circuits of a circuit board is identified (302). Each power circuit may provide power to one or more components, e.g., computing components and/or electrical components. The discharge times may be identified based on a calibration operation. For example, a calibration circuit, such as the calibration circuit 130 of FIG. 1, may perform a calibration operation to determine the discharge time for each of the power circuits. The discharge time for a power circuit indicates an amount of time previously taken (e.g., during a calibration operation) for a voltage level of the power circuit to decrease from a normal operating voltage to a specified voltage level after power was removed from the power circuit. The calibration circuit may provide data specifying the discharge times to the hot swap controller or delay circuit.

A delay time period for the circuit board is determined based on the discharge times (304). For example, the longest discharge time may be selected as the delay time period so that each power circuit of the circuit board has sufficient time for its voltage level to decrease to the specified voltage during a power cycling event. The delay time period may be based on the longest discharge time. For example, the delay time period may be the sum of the longest discharge time and some specified amount of time or percentage of the longest discharge time.

A command is received to cycle power to one or more components (e.g., computing components) of the circuit board (306). For example, the command may be a power cycle command to cycle power for a circuit board that includes the computing components. The command may be sent from a remote device (e.g., a computer) or a local device (e.g., a device installed on the circuit board). The command may be received by one or more controllers or circuits, e.g., the hot swap controller and/or the delay circuit. The controllers or circuits may be installed on (or supported by) the same circuit board as the components. However, the controllers or circuits may receive power from a different power source than the power circuits that provide power to the components. In this way, the controller(s) can remain powered during the power cycling event.

Power is removed from the power circuits in response to the command to cycle power to the components (308). For example, the hot swap controller or delay circuit may cause the power to be removed in response to receiving the command. In some implementations, the hot swap controller or delay circuit operates a switch that selectively allows power from an input power supply to energize the power circuits for the components. For example, the switch may have a first position (e.g., open) in which the switch blocks the input power from energizing the power circuits. The switch may also have a second position (e.g., closed) in which the switch allows the input power to energize the power circuits. As described above, the switch may be a semiconductor switch that is installed on or otherwise supported by the circuit board on which the computing and/or electrical components are installed.

In response to receiving the command, the hot swap controller or delay circuit may cause the switch to operate in the first position. For example, the controller(s) may cause the switch to move from the second position to the first position. In response, the voltage level of each power circuit may begin dropping due to the loss of power. In addition, the computing components may power down in response to the loss of power.

A timer is started (310). For example, the timer may be started at the time at which power is removed from the power circuits. The timer may be part of the delay circuit.

Removal of the power from the power circuits is maintained until the delay time period lapses (312). For example, the delay circuit may monitor the timer while power is removed from the power circuits.

A determination is made whether the timer has reached the delay time period (314). For example, the delay circuit may periodically compare the amount of time elapsed at the timer to the delay time period. If the timer has not reached the delay time period (e.g., the elapsed amount of time is less than the delay time period), removal of the power to the power circuits is maintained.

If the timer has reached the delay time period, power is restored to the power circuits and their respective components (316). For example, the delay circuit may cause the hot swap controller to return the switch to the second position (e.g., closed) to allow the input power to re-energize the power circuit. With the power circuit energized, the computing components can return to their normal operation.

FIG. 4 is a flow diagram of an example calibration process 400. Operations of the process 400 can be implemented, for example, by a data processing apparatus, such as calibration circuit 130 of FIG. 1. The process 400 can also be implemented by instructions stored on a non-transitory computer storage medium, where execution of the instructions by a data processing apparatus cause the data processing apparatus to perform the operations of the process 400.

Power is removed from power circuits (402). For example, a switch, such as the switch 112 of FIG. 1, that selectively provides power to the power circuits may be opened to remove power from the power circuits.

The voltage level of each power circuit is monitored until the voltage level decreases to a specified voltage level (404). For example, the calibration circuit may include voltage detectors that monitor the voltage level of each power circuit. The voltage levels can be compared to the specified voltage level to determine whether the voltage level has decreased to the specified voltage level.

A discharge time is determined for each power circuit (406). The discharge time for a power circuit indicates an amount of time taken for the voltage level of the power circuit to decrease from a normal operating voltage to a specified voltage level after power was removed from the power circuit. The calibration circuit can monitor, for each power circuit, the amount of time that it takes for the circuit's voltage level to decrease to the specified voltage level. Data specifying the discharge time can then be provided to another device, such as a hot swap controller or delay circuit for use in delaying restoration of power to the power circuits during a power cycling event.

Embodiments of the subject matter and the operations described in this specification can be implemented in electronic circuitry (e.g., digital and/or analog electronic circuitry), or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
identifying, by a calibration circuit and for each of a plurality of circuits of an electrical device, a discharge time for the circuit that indicates an amount of time previously taken for a voltage level of the circuit to decrease from a normal operating voltage to a specified voltage level after power was removed from the circuit;
determining, by the calibration circuit, a delay time period for the electrical device based on each discharge time;
receiving, by a control circuit and from a computing device, a power cycle command to cycle power to one or more components of the electrical device; and
in response to receiving the power cycle command:
removing, by the control circuit, power from the circuits for an amount of time that corresponds to the delay time period, the control circuit removing power from the circuits by causing a switch electrically coupled between a power source and the circuits to open; and
restoring, by the control circuit, power to the circuits in response to the amount of time lapsing by causing the switch to close.

2. The method of claim 1, wherein the electrical device is a circuit board.

3. The method of claim 1, wherein determining the delay time period comprises selecting, as the delay time period, the discharge time indicating a longest amount of time from among the amounts of time for the plurality of circuits.

4. The method of claim 1, further comprising performing a calibration operation, the calibration operation comprising:
removing power from the circuits; and
determining, for each of the circuits, the amount of time taken for the voltage level of the circuit to decrease to the specified voltage level;
wherein identifying a discharge time for each of the plurality of circuits of the electrical device comprises identifying the discharge times determined from the calibration operation.

5. The method of claim 4, wherein the calibration operation is performed periodically based on a calibration time period.

6. The method of claim 4, further comprising determining that the voltage level of a given circuit of the plurality of circuits exceeded the specified voltage level for a time period that exceeded the discharge time for the given circuit after power was removed from the circuits during a power cycling event for the electrical device and, in response, initiating the calibration operation.

7. The method of claim 4, further comprising determining that an amount of time for the voltage level of a given circuit to discharge during a power cycling event of the electrical device exceeded the discharge time for the given circuit by at least a threshold amount of time and, in response, initiating the calibration operation.

8. The method of claim 4, wherein the calibration operation is performed in response to a change in one or more of the components of the electrical device.

9. A circuit board, comprising:
 a plurality of circuits that each provide power to a respective set of one or more computing components; and
 one or more control circuits and a calibration circuit for managing a power cycling event for the sets of one or more computing components, the one or more control circuits being arranged to:
  identify, by the calibration circuit and for each of the plurality of circuits, a discharge time for the circuit that indicates an amount of time previously taken for a voltage level of the circuit to decrease from a normal operating voltage to a specified voltage level after power was removed from the circuit;
  determine, by the calibration circuit, a delay time period for the circuit board based on the discharge times;
  receive, by the one or more control circuits and from a computing device, a power cycle command to cycle power to the sets of one or more computing components of the circuit board; and
  in response to receiving the power cycle command:
   remove, by the one or more control circuits, power from the circuits for an amount of time that corresponds to the delay time period by causing a switch electrically coupled between a power source and the circuits to open; and
   restore, by the one or more control circuits, power to the circuits in response to the amount of time lapsing by causing the switch to close.

10. The circuit board of claim 9, wherein determining the delay time period comprises selecting, as the delay time period, the discharge time indicating a longest amount of time from among the amounts of time for the plurality of circuits.

11. The circuit board of claim 9, wherein the calibration circuit is arranged to perform a calibration operation, the calibration operation comprising:
 removing power from the circuits; and
 determining, for each of the circuits, the amount of time taken for the voltage level of the circuit to decrease to the specified voltage level;
 wherein identifying a discharge time for each of the plurality of circuits comprises identifying the discharge times determined from the calibration operation.

12. The circuit board of claim 11, wherein the calibration operation is performed periodically based on a calibration time period.

13. The circuit board of claim 11, wherein the one or more control circuits are arranged to determine that the voltage level of a given circuit of the plurality of circuits exceeded the specified voltage level for a time period that exceeded the discharge time for the given circuit after power was removed from the circuits during a power cycling event for the circuit board and, in response, initiating the calibration operation.

14. The circuit board of claim 11, wherein the one or more control circuits are arranged to determine that an amount of time for the voltage level of a given circuit to discharge during a power cycling event of the circuit board exceeded the discharge time for the given circuit by at least a threshold amount of time and, in response, initiating the calibration operation.

15. The circuit board of claim 11, wherein the calibration operation is performed in response to a change in one or more of the components of the circuit board.

16. A computer storage medium encoded with a computer program, the program comprising instructions that when executed by data processing apparatus of a control circuit cause the data processing apparatus to perform operations comprising:
 receiving, from a calibration circuit and for each of a plurality of circuits of an electrical device, a discharge time for the circuit that indicates an amount of time previously taken for a voltage level of the circuit to decrease from a normal operating voltage to a specified voltage level after power was removed from the circuit;
 determining, by the data processing apparatus of the control circuit, a delay time period for the electrical device based on each discharge time;
 receiving, by the data processing apparatus of the control circuit, from a computing device, a power cycle command to cycle power to one or more components of the electrical device; and
 in response to receiving the power cycle command:
  removing, by the data processing apparatus of the control circuit, power from the circuits for an amount of time that corresponds to the delay time period by causing a switch electrically coupled between a power source and the circuits to open; and
  restoring, by the data processing apparatus of the control circuit, power to the circuits in response to the amount of time lapsing by causing the switch to close.

17. The computer storage medium of claim 16, wherein the operations further comprise performing a calibration operation, the calibration operation comprising:
 removing power from the circuits; and
 determining, for each of the circuits, the amount of time taken for the voltage level of the circuit to decrease to the specified voltage level;
 wherein identifying a discharge time for each of the plurality of circuits of the electrical device comprises identifying the discharge times determined from the calibration operation.

18. The computer storage medium of claim 17, wherein the calibration operation is performed periodically based on a calibration time period.

19. The computer storage medium of claim 18, wherein the operations further comprise determining that the voltage level of a given circuit of the plurality of circuits exceeded the specified voltage level for a time period that exceeded the discharge time for the given circuit after power was removed from the circuits during a power cycling event for the electrical device and, in response, initiating the calibration operation.

20. The computer storage medium of claim 18, wherein the operations further comprise determining that an amount of time for the voltage level of a given circuit to discharge during a power cycling event of the electrical device exceeded the discharge time for the given circuit by at least a threshold amount of time and, in response, initiating the calibration operation.

\* \* \* \* \*